United States Patent
Yoon

(10) Patent No.: US 7,012,787 B2
(45) Date of Patent: Mar. 14, 2006

(54) HEAD SUSPENSION ASSEMBLY FOR HARD DISK DRIVE

(75) Inventor: Woo-Young Yoon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 10/223,694

(22) Filed: Aug. 20, 2002

(65) Prior Publication Data

US 2003/0137775 A1 Jul. 24, 2003

Related U.S. Application Data

(63) Continuation-in-part of application No. 08/885,993, filed on Jun. 30, 1997, now abandoned.

(30) Foreign Application Priority Data

Jun. 29, 1996 (KR) .................................. 96-26440

(51) Int. Cl.
*G11B 21/16* (2006.01)

(52) U.S. Cl. ................................................. 360/245.9
(58) Field of Classification Search ............ 360/245.9, 360/244.3, 244.7, 245.5
See application file for complete search history.

(56) References Cited

U.S. PATENT DOCUMENTS

| | | | | |
|---|---|---|---|---|
| 5,519,552 A | * | 5/1996 | Kohira et al. ............. | 360/244.3 |
| 5,612,840 A | * | 3/1997 | Hiraoka et al. .......... | 360/245.9 |
| 5,657,186 A | * | 8/1997 | Kudo ......................... | 360/104 |
| 5,666,717 A | * | 9/1997 | Matsumoto ................. | 360/104 |
| 5,711,063 A | * | 1/1998 | Buddhe .................... | 29/603.06 |
| 5,781,379 A | * | 7/1998 | Erpelding .................. | 360/104 |
| 5,844,750 A | * | 12/1998 | Takaike ..................... | 360/104 |

* cited by examiner

*Primary Examiner*—William Korzuch
*Assistant Examiner*—Mark Blouin
(74) *Attorney, Agent, or Firm*—Robert E. Bushnell, Esq.

(57) ABSTRACT

There is disclosed a head suspension assembly for a hard disk drive for supporting the hard disk drive's actuator and magnetic head, wherein a flexible circuit board is fixed to one end of the actuator, and the magnetic head is mounted on flexure disposed at a front end of the flexible circuit board. The flexible circuit board is fixed to the actuator by adhesives.

12 Claims, 6 Drawing Sheets

Detail "A"

HEAD SUSPENSION ASSEMBLY FOR HARD DISK DRIVE

This application is a Continuation-in-part of U.S. patent application Ser. No. 08/885,993 entitled Head Suspension Assembly For Hard Disk Drive filed on Jun. 30, 1997 abandoned

BACKGROUND OF THE INVENTION

1. Field of the Invention

The present invention generally relates to a suspension assembly used for supporting a hard disk drive's head. More particularly, it relates to a head suspension assembly for a hard disk drive using a flexible circuit board (FCB).

2. Description of the Related Art

Due to the rapid development of powerful computer systems and the advent of the information age, the demand for high-capacity and high-density computer storage media has increased. Accordingly, various research and development have been devoted to the fabrication of computer storage media with superior recording density characteristics.

In addition, to improve the data processing speed, techniques of either increasing the number of rotation of a hard disk drive or manufacturing its actuator of light weight have been proposed. Besides, considering a signal-to-noise ratio in the manufacture of hard disk drives becomes of great importance in order to provide high-capacity random-access storage and high recording density.

A hard disk drive having a base 9, and a cover 10, as shown in FIG. 1, serves as an auxiliary computer storage media, and includes a magnetic disk 2 that rotates by a spindle motor 1, a magnetic head, or transducer, 5 which reads, records, or erases data on the magnetic disk, a metallic suspension assembly 6 which supports head 5 from an access mechanism, or actuator body, 4 which positions the read/write head onto the required track of magnetic disk 2 by pivoting on a pivot 3, an electronic control circuit 7 which controls the above components, and an electrical interface 8 which connects the drive with a host computer system.

The following description relates to the operation of the hard disk drive. Once power is applied to the hard disk drive, the spindle motor rotates at predetermined speeds. As the spindle motor rotates, the magnetic disk also turns. Subsequently, when the disk rotates at high speeds, the magnetic head flies to a predetermined height, and is positioned to the required track of the magnetic disk. The hard disk drive sends a ready-to-read/write/erase signal into the host computer system.

When the reading/writing information is input to the hard disk drive under the above condition, the access mechanism pivots about its vertical axis in response to a position/speed signal output from the electronic control circuit, and the read/write head of the access mechanism moves to the required track of the magnetic disk. The read/write head performs the read/write operation by a read/write circuit. The position and speed of the head are controlled by the control circuit during the read/write operation.

The magnetic head, one of the most important components of the hard disk drive, is mounted on the access mechanism, i.e., actuator body, by means of a head suspension assembly which serves as a spring.

FIGS. 2 and 3 each depict a conventional head suspension assembly. FIG. 2 shows a side view of the conventional head suspension assembly, and FIG. 3 is a perspective view of the same.

Referring to FIGS. 2 and 3, a metallic suspension assembly 20 is designed to be in substantially triangular shape by using a thin metallic plate. The suspension assembly 20 includes a base plate 23 which is fixed to an actuator body 22, a load beam portion 24 which serves as a spring, and a flexible structure 25 (flexure) that is fixed onto a front end of the load beam portion 24 by welding and to which a head 21 is attached. A boss 26 and a swaging hole 27 are formed on a base plate 23. Actuator body 22 has a swaging tooling hole 28. Load beam portion 24 has flanges 30 bent at right angles on both sides except a region where a resilient portion 29 is formed When fixing suspension assembly 20 to actuator body 22, boss 26 of suspension assembly 20 is first inserted into swaging tooling hole 28 of actuator body 22. As a steel ball (not illustrated) of larger diameter than the diameter of swaging hole 27 is forced through swaging hole 27, boss 26 expands horizontally whereby suspension assembly 20 is fixed to actuator body 22. A magnetic wire (not illustrated) is connected to an output terminal of head 21 by laser welding. The wire is connected to a terminal of a flexible circuit board (not illustrated) by soldering, wherein the terminal of the flexible circuit board is then connected to an input terminal of a pre-amplifier (not illustrated).

According to the above-described technique, the head suspension assembly is fixed to the actuator body by a ball swaging process. Problems that occur due to the mechanical damage during the ball swaging process effect the head performance. In addition, because of the noise created by connecting the head output terminal and the pre-amplifier input terminal with the magnetic wire by laser welding and soldering, and the wire's resistance, it is difficult to obtain a high signal-to-noise ratio.

FIG. 4 is another conventional head suspension assembly. To obtain a high signal-to-noise ratio, according to this conventional head suspension assembly, a flexible circuit board 41 is bonded to a load beam portion 44 of a metallic suspension assembly 40, so that flexible circuit board 41 is directly connected to a head.

In the magnetic head of the above head suspension assembly of FIG. 4, there are four lead wires from the head's output terminal (not shown) corresponding to pad 1, pad 2, pad 3 and pad 4, and the flexible circuit board is bonded to the suspension assembly instead of using the lead wires. The above-described head suspension assembly may prevent a decrease of the signal-to-noise ratio by the direct connection of the head and flexible circuit board but still has a problem of deterioration to the head performance by the ball swaging process used to bond the suspension assembly to the actuator body. Particularly, in case of a contact-type head/media, the required gram load force is several tens or several hundreds of milligrams (mg), so there is a risk of spoiling the design of the suspension assembly employing the ball swaging process.

SUMMARY OF THE INVENTION

It is an object of the present invention to provide a head suspension assembly for a hard disk drive which assures a high signal-to-noise ratio, a high recording density, and increased information storage capacity.

It is another object of the present invention to provide a head suspension assembly for a hard disk drive which is easy to assemble and increases a signal-to-noise ratio.

It is still another object of the present invention to provide a head suspension assembly for a hard disk drive which avoids damage to a head of the hard disk drive due to mechanical vibration and shock.

In order to realize the above objects, the present invention provides a head suspension assembly for a hard disk drive which supports the hard disk drive's magnetic head. A flexible circuit board is fixed to actuator body, and the magnetic head is mounted on a front end of the flexible circuit board. The flexible circuit board is fixed to the actuator body by adhesives.

Additionally, in order to realize the above objects, for a contact-type head/media a flexible structure is integrally formed to extend from a front portion of the flexible circuit board to which the head is attached The flexible structure is provided with wire so that the head's pads are electrically connected to an input terminal of an amplifier. The head's lead wire is arranged to connect the head's back. The head is fixed to the flexible structure of the flexible circuit board by laser welding.

In order to realize the above objects further, for a flying-type head/media the flexible circuit board includes a metallic flexible structure to which the head is attached. The flexible structure is provided with a terminal to be aligned with the head's lead wire. The flexible structure is plated with NiFe. The flexible structure is fixed to a portion of the flexible circuit board by laser welding to be aligned with the flexible circuit board's lead wire.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
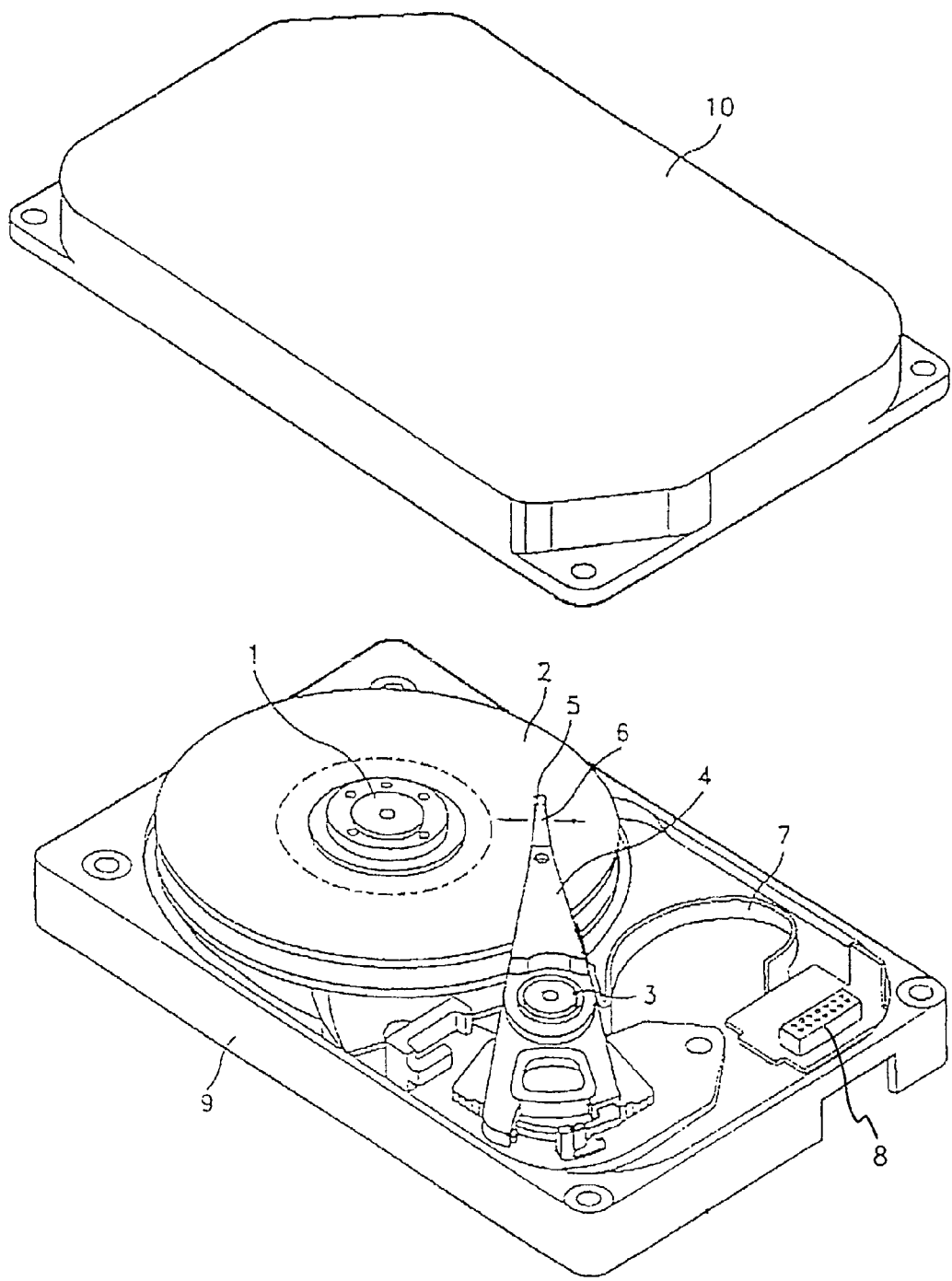
FIG. 1 is a perspective view of a hard disk drive.
Figure 2:
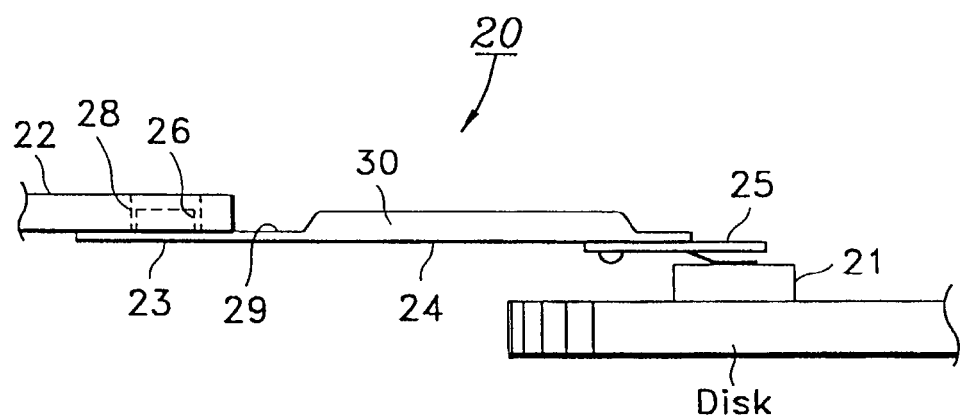
FIG. 2 is a conventional head suspension assembly for a hard disk drive.
Figure 3:
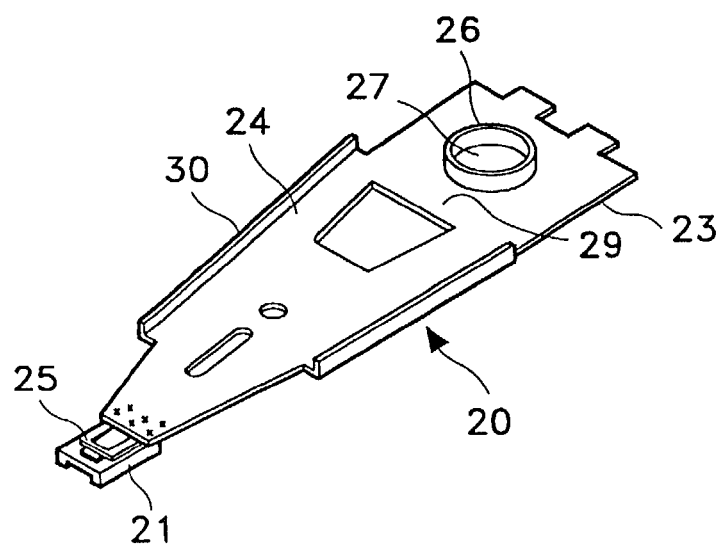
FIG. 3 is a perspective view of the head suspension assembly of FIG. 2.
Figure 4:
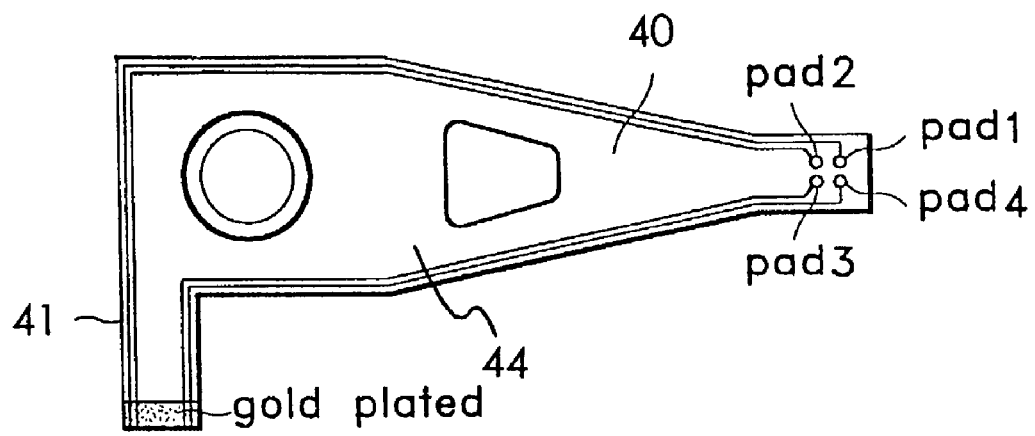
FIG. 4 is another conventional head suspension assembly for a hard disk drive.

Reference will now be made in detail to the preferred embodiment of the present invention, examples of which are illustrated in the accompanying drawings. Like reference numerals designate like reference parts throughout the specification and drawings.

Figure 5A:
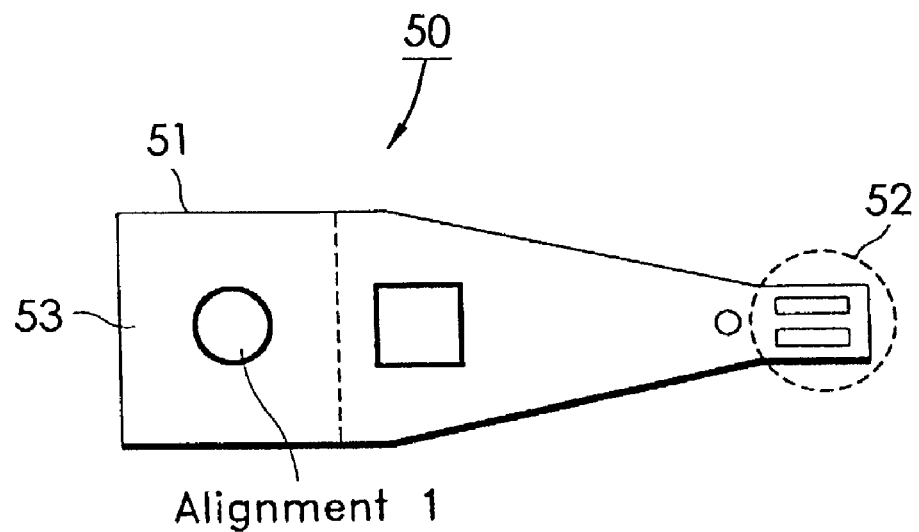
FIGS. 5A and 5B depict a head suspension assembly for a hard disk drive in accordance with a first preferred embodiment of the present invention.
Figure 5B:
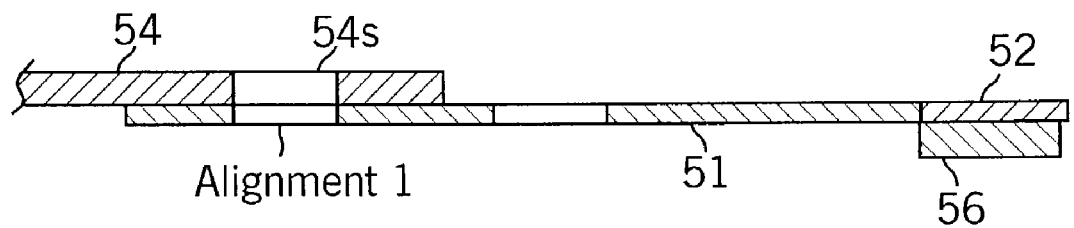
Figure 6A:
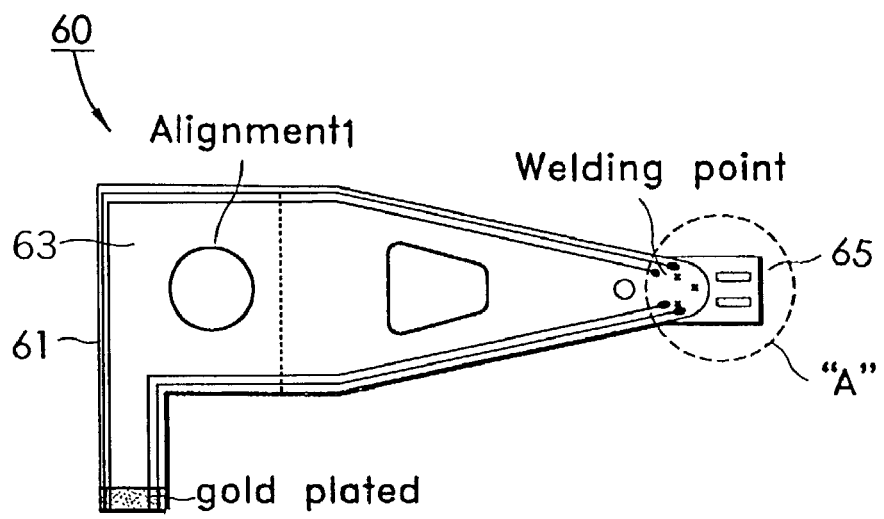
FIGS. 6A, 6B and 6C depict a head suspension assembly for a hard disk drive in accordance with a second preferred embodiment of the present invention.
Figure 6B:
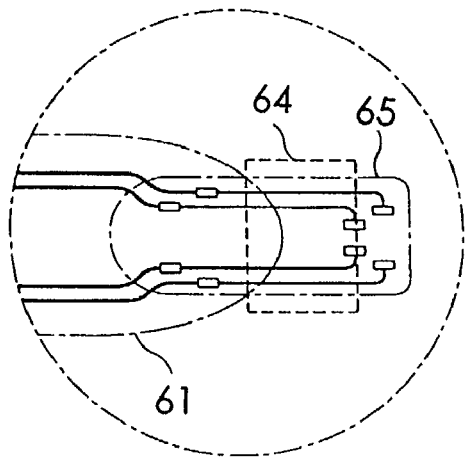
Figure 6C:
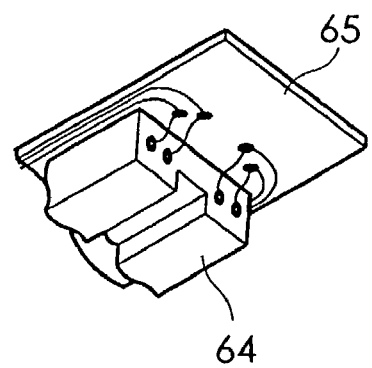

FIGS. 5–6C each depict a head suspension assembly for a hard disk drive using a flexible circuit board in accordance with preferred embodiments of the present invention. FIGS. 5A and 5B depict a head suspension assembly for a hard disk drive with a contact-type head in accordance with a first preferred embodiment of the present invention, and illustrates one embodiment of the contact-type head/media utilizing the head which is designed for flying the head below the flying height of the disk surface. FIGS. 6A, 6B and 6C depict a head suspension assembly for a hard disk drive with a flying-type head in accordance with a second preferred embodiment of the present invention and illustrates one embodiment of the flying-type head/media using the head which is designed for flying the head different from that of FIG. 5, over the flying height of the disk surface.

Referring to FIGS. 5A and 5B, a head suspension assembly 50 used for a contact-type head is realized through a flexible circuit board 51 instead of utilizing a metallic suspension assembly of the conventional art. A flexible structure (flexure) 52 to which the head is fixed is integrally formed on to extend from one end of flexible circuit board 51, flexure 52 and flexible circuit board 51 being in the same horizontal plane.

A contact portion 53 is formed on the back of flexible circuit board 51, and this contact portion 53 is attached to lower surface portion of an actuator body 54 by adhesives with alignment hole 1 being aligned with swagging hole 54s of actuator body 54. The head 56 will be attached to flexure 52 by laser welding. Flexible circuit board 51 is provided with wire (not shown) to connect pads of the head with an amplifier's input terminal (not shown). The lead wire (not shown) of the head is connected to the back of the head 56.

FIGS. 6A, 6B and 6C show a head suspension assembly for a hard disk drive in accordance with the second preferred embodiment of the present invention. FIG. 6A depicts the configuration of the head suspension assembly in accordance with the second preferred embodiment of the present invention. FIG. 6B is an enlarged view of "A" of FIG. 6A, and FIG. 6C depicts the connection of the head's lead wire.

Referring to FIGS. 6A, 6B and 6C, a suspension assembly 60 for supporting a flying-type head 64 of a hard disk drive is realized through a flexible circuit board 61. A metallic flexible structure (flexure) 65 to which head 64 is fixed is attached to a front end of flexible circuit board 61 by laser welding to be aligned with the lead wire of flexible circuit board 61. Flexure 65 extends from the laser welding points past the front end of flexible circuit board 61. A terminal is formed in flexure 65 to be aligned with the lead wire of head 64 and is plated with NiFe.

A rear end portion of flexible circuit board 61 is attached to an actuator body (not illustrated) by adhesives in a manner similar to that shown in FIG. 5B. That is, a contact portion 63 is formed on the back of flexible circuit board 61, and this contact portion 63 is attached to lower surface portion of an actuator body (not shown) by adhesives with alignment hole 1 being aligned with a swagging hole (not shown) of the actuator body in a manner similar to that shown in FIG. 5B.

Head 64 is bonded to flexure 65 by epoxy adhesives. Flexure 65's terminal is connected with the output terminal of head 64 by wiring technique, and this is connected with an input terminal of flexible circuit board 61's pre-amplifier. Flexible circuit board 61 is formed to provide gram load force, and the end of its wire is plated with gold to minimize a loss of the electricity.

Figure 7A:
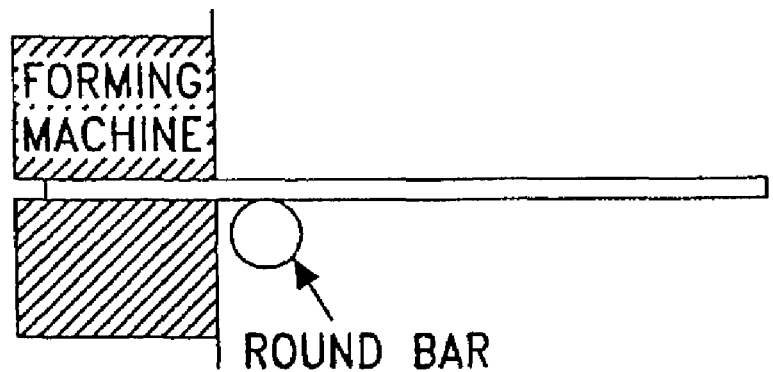
FIGS. 7A and 7B depict a process of forming a suspension in a forming machine.
Figure 7B:
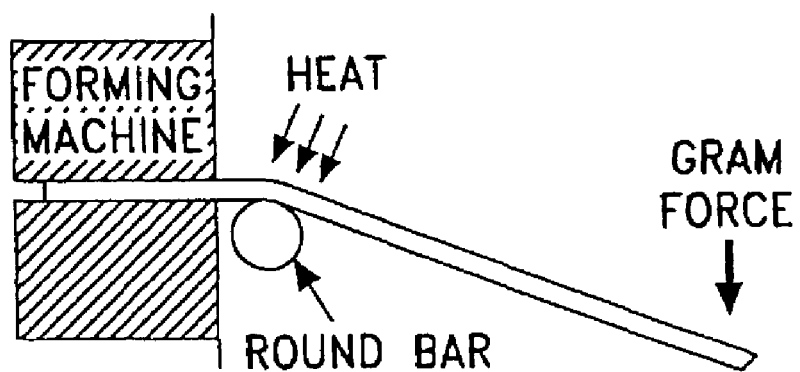

FIGS. 7A and 7B depict a process of forming a suspension in a forming machine. The forming is performed for an optimization of the thickness of the suspension as follows. Each suspension is formed by a dicing in use of the dicing machine, and then the suspension is installed at the forming machine forming the gram force to thereby make a contact with a round bar with a reference to a portion to be formed. And then, a front portion is pressed correspondingly to a target gram load in order to make the portion to be formed be rounded, and then the forming is completely performed by applying heat to the portion to be formed. The heat and thickness are optimized as a correlation according to the design spec.

The portion of the flexible circuit board which is bonded to the actuator body is designed to be a little thicker than the other portions in order not to lose its original shape during adhesion and not to be affected by the force created during operation.

Since some epoxy adhesives cannot stick at normal internal hard disk temperatures, after joining the actuator body and the flexible circuit board together, the actuator body and the flexible circuit board's contact point are further adhered at about 60 to 90° C.

As described above, the present invention can minimize a loss of a signal-to-noise ratio of a contact-type head/media and a flying-type head/media by using the flexible circuit board itself as a suspension assembly. In addition, the use of adhesives to attach the flexible circuit board's rear end portion to the actuator body may avoid mechanical damage to the magnetic head and change in the suspension assembly's static roll or pitch and gram load force thereby protecting the head's operating position and performance.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A head suspension assembly for a hard disk drive having an actuator body, comprising:
   a flexible circuit board, said flexible circuit board having a rear end portion and a front end portion, said rear end portion being fixed to a front end surface portion of said actuator body with an alignment hole in the rear end portion of said flexible circuit board being aligned with a hole in said actuator body;
   a flexure connected to said front end portion of said flexible circuit board and extending beyond said front end portion of said actuator body, said flexure comprising a flexible structure integrally formed to extend from said front end portion of said flexible circuit board, said flexible structure and said flexible circuit board being disposed within the same plane, said plane being the same horizontal plane; and
   a magnetic head mounted on a front end portion of said flexure.

2. A head suspension assembly according to claim 1, said flexible structure being provided with wire so that pads of said head are electrically connected to said flexible circuit board.

3. A head suspension assembly according to claim 2, a lead wire of said head being arranged to connect to a back portion of said head.

4. A head suspension assembly according to claim 3, said head being fixed to the flexible structure by laser welding.

5. A head suspension assembly for a hard disk drive having an actuator body, comprising:
   a flexible circuit board, said flexible circuit board having a rear end portion and a front end portion, said rear end portion being fixed to a front end surface portion of said actuator body with an alignment hole in the rear end portion of said flexible circuit board being aligned with a hole in said actuator body;
   a flexure connected to said front end portion of said flexible circuit board and extending beyond said front end portion of said actuator body, said flexure comprising a flexible structure integrally formed to extend from said front end portion of said flexible circuit board, said flexible structure being a metallic flexible structure welded onto said front end portion of said flexible circuit board, said metallic flexible structure being provided with a terminal to be aligned with a lead wire of said head and being plated with NiFe, said flexible structure and said flexible circuit board being disposed within the same plane, said plane being the same horizontal plane; and
   a magnetic head mounted on a front end portion of said flexure.

6. A head suspension assembly for a hard disk drive having an actuator body, comprising:
   a flexible circuit board, a rear end portion of said flexible circuit board having a back surface forming a contact portion of said flexible circuit board, said contact portion being adhesively attached to a front end portion of said actuator body;
   a flexure integrally connected to a front end portion of said flexible circuit board and extending beyond said front end portion of said flexible circuit board, said flexure and said flexible circuit board being disposed within the same horizontal plane; and
   a magnetic head mounted on a portion of said flexure, a substantial portion of said head being disposed beyond the front end portion of said flexible circuit board.

7. A head suspension assembly according to claim 6, said flexure comprising a flexible structure provided with wire so that pads of said head are electrically connected to said flexible circuit board.

8. A head suspension assembly according to claim 6, a lead wire of said head being arranged to connect to a back portion of said head.

9. A head suspension assembly according to claim 6, said head being fixed to the flexure by laser welding.

10. A head suspension assembly according to claim 8, said head being fixed to the flexure by laser welding.

11. A head suspension assembly according to claim 6, said flexure being integrally connected to the flexible circuit board by laser welding.

12. A head suspension assembly according to claim 6, further comprising an alignment hole in the rear end portion of said flexible circuit board being aligned with a hole in said front end portion of said actuator body.

* * * * *